United States Patent [19]

Stratton

[11] Patent Number: 5,293,947
[45] Date of Patent: Mar. 15, 1994

[54] VARIABLE SPEED AC ELECTRIC DRIVE VEHICLE

[75] Inventor: Robert D. Stratton, Portland, Oreg.

[73] Assignee: Wagner Mining and Construction Equipment Co., Portland, Oreg.

[21] Appl. No.: 753,719

[22] Filed: Sep. 3, 1991

[51] Int. Cl.$^5$ ................................................ B60L 9/16
[52] U.S. Cl. ...................................... 180/2.1; 180/65.4; 191/4
[58] Field of Search ............... 180/2.1, 65.2, 65.3, 180/65.4, 65.1; 60/698, 716, 717, 718, 719; 74/661; 191/33 R, 38, 4; 290/14, 15, 17; 318/148

[56] References Cited

U.S. PATENT DOCUMENTS

| | | |
|---|---|---|
| 2,210,675 | 8/1940 | Kother ............................ 191/4 |
| 3,704,760 | 12/1972 | Maruyama ..................... 180/66 |
| 3,719,881 | 3/1973 | Shibata et al. ................. 180/65.4 |
| 4,099,589 | 7/1978 | Williams ......................... 180/65 |
| 4,185,710 | 1/1980 | Kronogard ..................... 180/14 |
| 4,400,997 | 8/1983 | Fiala ............................... 74/661 |
| 4,483,148 | 11/1984 | Minami ........................... 60/698 |
| 4,807,803 | 3/1989 | Ahern et al. ................... 180/65.4 |
| 4,951,769 | 8/1990 | Kawamura ..................... 140/65.4 |
| 4,953,646 | 9/1990 | Kim ................................ 180/65.4 |
| 5,103,923 | 4/1992 | Johnston et al. .............. 180/65.4 |

*Primary Examiner*—Richard M. Camby
*Attorney, Agent, or Firm*—Klarquist, Sparkman, Campbell, Leigh & Whinston

[57] ABSTRACT

An externally powered electric vehicle with an on-board variable speed AC drive motor drawing power from an overhead trolley line. The vehicle may include an auxiliary power source in the form of a battery or internal combustion engine for powering the vehicle when the vehicle is disconnected from the trolley line.

38 Claims, 2 Drawing Sheets

VARIABLE SPEED AC ELECTRIC DRIVE VEHICLE

TECHNICAL FIELD

This invention relates to electric vehicles and more particularly to such vehicles powered from an external source of electricity.

BACKGROUND OF THE ART

Externally powered electric vehicles are commonly used in many industries, particularly the mining industry, in which safety requirements prevent or restrict the underground use of internal combustion engine-powered vehicles. Such electric vehicles typically draw power from an external trolley line or trailing umbilical cord that supplies alternating current (AC). Trolley lines are typically employed by hauling trucks; umbilical lines are generally used by scoop vehicles. The alternating current may be used to power an AC motor or may be rectified to power a direct current (DC) powered motor.

Existing vehicles using AC motors have had several disadvantages relating to their controllability. Previously existing AC controllers were unavailable or unsuitable for use on mobile vehicles due to their size, complexity, and environmental sensitivity, particularly to acceleration and mechanical shock. As a result, such systems have been used only for monorail-type storage and retrieval systems having limited mobility within a restricted track such as along a single aisle in an automated warehouse. In such systems, the controller is not transported on the car, and the environment is easily controlled.

At low speeds, AC motors are susceptible to "cogging," which impairs smooth operation. AC motors have been employed in electric vehicles, but these have been constant speed motors. Thus, they require a complex transmission and a clutch slipping technique employed by skilled operators to drive the vehicle at a variable speed.

DC motors, on the other hand, are easily controllable. However, as a practical matter they require an inefficient conversion of AC power to DC. Such an AC to DC conversion system is shown, for example, in U.S. Pat. No. 4,483,148 to Minami.

In addition, DC motors are more complex than AC motors, with brushes that are prone to wear. As a result, they are more expensive to maintain and less reliable than AC motors. The trolley line approach is also unsuitable for providing DC power from an external source, due to power loss through line resistance, particularly on long lines. Some prior art systems employ both AC and DC motors to gain the advantages of each system. However, this comes at the cost of added complexity and redundancy. U.S. Pat. No. 4,099,589 to Williams, for example, shows an electric car with AC and DC drive motors. The car may be driven by the DC motor alone during short range stop-and-go driving where controllability is important, and may be driven by the AC motor alone during relatively constant speed long range driving when efficiency is critical. The use of redundant motors, however, substantially increases cost, and both motors rely on an on-board internal combustion engine for electric power generation.

SUMMARY OF THE INVENTION

The primary objects of the invention are to provide:
1. an electric drive vehicle driven by a variable speed AC electric drive motor that operates smoothly and efficiently at all vehicle speeds;
2. a vehicle as aforesaid that can be supplied with external electric power from a trolley line;
3. a vehicle as aforesaid that includes an on-board auxiliary power source;
4. a vehicle as aforesaid in which an auxiliary on-board power source includes an on-board means for supplying backup AC electric power to the variable speed AC drive motor; and
5. a vehicle as aforesaid which includes on-board means to differentiate and switch between trolley and on-board auxiliary power.

According to the present invention, the primary objects are achieved by providing an electric vehicle having an AC motor as its primary driver while the vehicle is connected to a trolley line. The AC motor is connected to an on-board variable speed controller and, in preferred embodiments, is switchable to an auxiliary on-board AC power source when the vehicle is disconnected from the trolley line.

The auxiliary power source preferably includes an on-board internal combustion engine for generating AC power to drive the primary AC drive motor, or for providing mechanical power directly to the vehicle drive train. Alternatively, the auxiliary power source may include an on-board DC battery connected to an inverter for providing AC power to the primary AC drive motor, or connected to a DC motor for directly driving the vehicle.

The foregoing and additional features and advantages of the present invention will be more readily apparent from the following detailed description which proceeds with reference to the accompanying drawings.

DETAILED DESCRIPTION OF A PREFERRED EMBODIMENT

Figure 1:
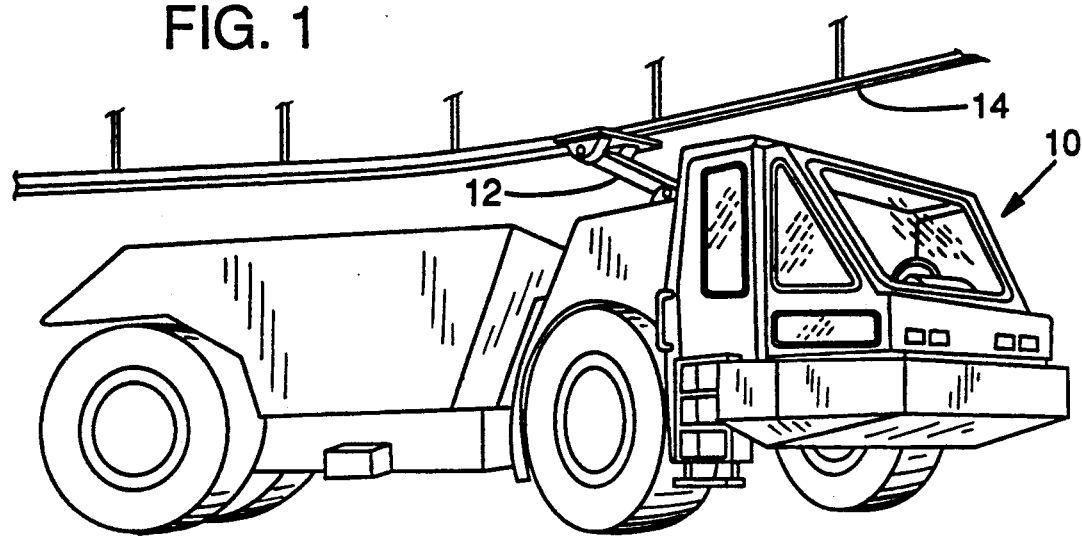
FIG. 1 is a perspective view of a mining vehicle according to the present invention.

FIG. 1 shows an electric mining vehicle 10 suitable for underground use. An articulated pantograph arm 12 extends upward from the vehicle, acting as a power link to make electrical contact with an electrically conductive overhead trolley line 14. The trolley line 14 is a curvilinear track defining the vehicle path. The line carries AC power at either 50 or 60hZ from a remote source (not shown) and includes four conductors: three providing three phase AC power and one connected to ground. Each of these four conductors is electrically contacted by the pantograph arm 12.

Figure 2:
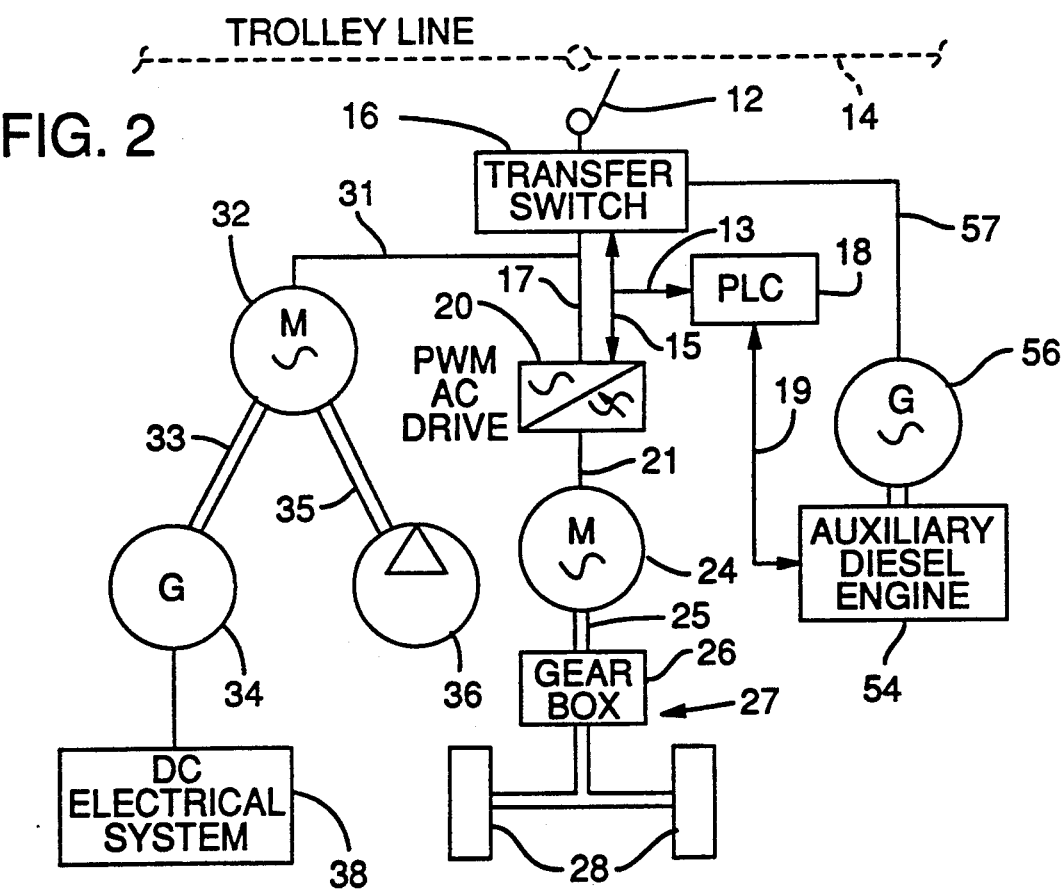
FIG. 2 is a schematic diagram of the preferred vehicle power and drive system using a diesel engine for generating electric power as an auxiliary power source.

FIG. 2 schematically illustrates a preferred embodiment of the vehicle drive system. A transfer switch 16 selectively receives AC power from the pantograph arm 12 and from alternative on-board backup sources, as will be discussed below. The switch 16 directs the AC power to various vehicle functions. A programmable logic controller (PLC) 18 automatically controls the function of the transfer switch 16 in response to vehicle operating conditions or manual operator selections. When proper connection is made between the trolley line 14 and the pantograph arm 12, the PLC 18 allows the operator to energize the vehicle's primary drive system.

The vehicle's primary drive system includes a commercially available pulse width modulated (PWM) AC motor speed controller 20, which varies the AC frequency of its output. The controller output is controlled by the PLC 18, which receives its signal from an operator foot pedal (not shown). The motor controller 20 is preferably enclosed in a dustproof protective housing (not shown) to prevent dust and damaging objects from impairing its function. While a conventional AC motor controller is large and bulky, it may be made more compact by using an alternative cooling system instead of conventional air cooling. For materials handling vehicle applications, the motor controller should be shock mounted to the vehicle to prevent damage from vibrations.

A primary variable speed AC drive motor 24 is connected to the AC output of the motor controller 20 and transmits power from an output shaft 25 through a vehicle gear box 26 portion of a mechanical transmission 27 to a set of ground-engaging wheels 28 for propelling the vehicle. With the motor directly coupled to the wheels, vehicle speed is directly proportional to motor speed. For typical hauling applications of an underground mining vehicle, the drive motor 24 might be rated at about 800 horsepower, although this may vary widely, depending on the application, hauling capacity and size of the vehicle.

As an alternative to a single AC drive motor coupled to a mechanical transmission, a set of separate variable speed AC wheel motors (not shown) may be electrically connected to the motor controller 20 for separately driving each wheel 28. In such embodiment, the output of each motor is directly connected to a corresponding wheel. This approach is appropriate for high powered vehicles, as four moderately sized motors may be more cost effective than one very large motor. The use of multiple wheel motors also eliminates the need for the mechanical transmission 27, including gear box 26.

According to still another alternative embodiment (not shown) a separate variable speed AC drive motor could be used, instead of single motor 24, to drive each axle of the vehicle.

The transfer switch 16 also provides AC power through line 31 to an accessory three phase AC motor 32, which operates at a constant speed, and is mechanically connected through drive lines 33, 35, respectively, to drive a 24 volt direct current alternator 34 and a hydraulic pump 36. The alternator 34 provides DC power to the vehicle's DC electrical system 38, while the hydraulic pump 36 pressurizes the vehicle's hydraulic system, including steering, dump mechanism and brakes.

A prime mover such as a diesel engine 54 mounted on the vehicle 10 provides an auxiliary or backup source of power for moving the vehicle when the pantograph arm 12 is disconnected from the trolley line, or when primary power is otherwise unavailable. This feature permits the vehicle to be shifted from one trolley line to another under its own power, and to maneuver where no trolley lines exist. The capacity of the auxiliary drive system need not be substantial, as the vehicle need only creep at a slow rate when disconnected from the trolley line 14.

The diesel engine 54 drives a three phase AC generator 56, which is electrically connected to provide AC power to the transfer switch 16. The transfer switch 16 provides AC power through conductor 17 to the motor controller 20 and through conductor 21 to drive motor 24 for driving the vehicle, and through conductor 31 to accessory AC motor 32 for powering the hydraulic and DC electrical systems 36, 38.

When auxiliary power is required, the operator's signal is transmitted through the programmable logic controller 18, which starts the diesel engine 54. Once the engine is running, the generator 56 is engaged, and stand-by power is available. The PLC 18 then coordinates the disconnection from the trolley line 14 and connection of auxiliary power to the motor controller 20 and accessory motor 32. Control signals between the PLC and diesel engine are transmitted through line 19. Control signals between the PLC, PWM and transfer switch are transmitted through lines 13 and 15. The power transfer is made without interruption of vehicle performance, except for the reduction in vehicle speed due to the limited available power from the on-board source. To reconnect with the trolley line 14 from the auxiliary power source, a similar procedure is followed, with the PLC 18 controlling and monitoring all required functions.

Figure 3:
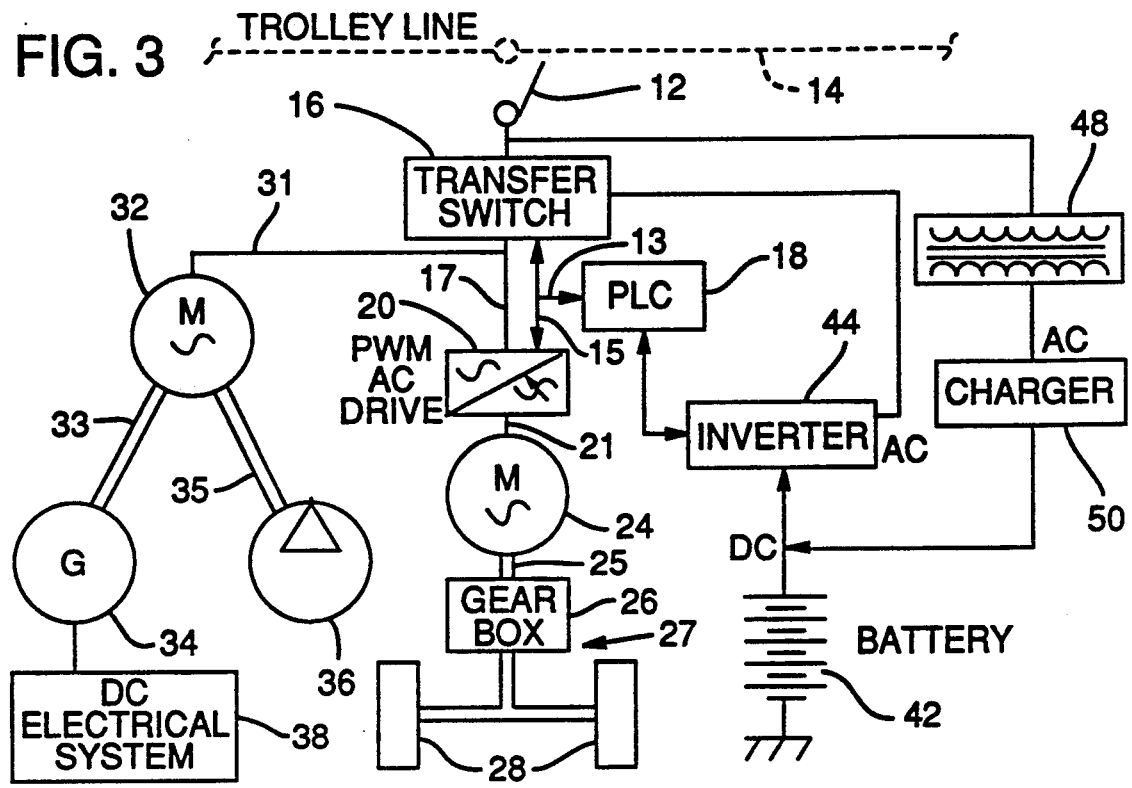
FIG. 3 is a schematic alternative vehicle power and drive system with a DC battery as an auxiliary power source.

In the alternative embodiment shown in FIG. 3, an electrical storage battery 42 mounted on the vehicle provides backup power. The battery 42 is electrically connected to an inverter 44, which converts direct current to alternating current. The inverter 44 provides AC power to the transfer switch 16, which directs the power to the vehicle's primary drive system and to the accessory AC motor 32. The function of the inverter 44 is controlled by the programmable logic controller 18. The battery 42 is kept charged by a transformer 48 and charger 50, which are arranged to draw AC power from the pantograph arm 12 and to convert it to DC power for charging the battery 42.

In an alternative embodiment not shown, the battery may be connected to a DC drive motor which is operably connected by a mechanical power transmission to the gear box 26. The vehicle may thus be driven when the pantograph arm 12 is disconnected, and the need for the inverter 44 is eliminated, although a separate speed controller for the DC motor would be required.

Figure 4:
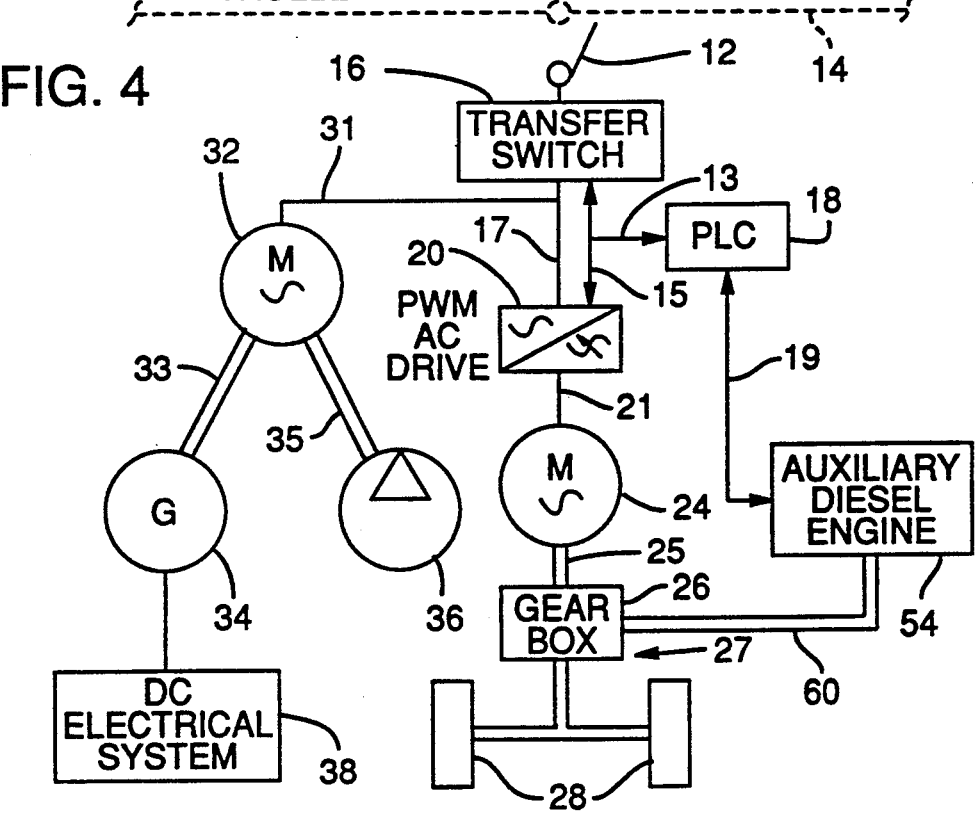
FIG. 4 is a schematic alternative vehicle power and drive system using a diesel engine for providing mechanical power directly to the vehicle drive train.

In an alternative embodiment shown in FIG. 4, the output from diesel engine 54 may be connected through a secondary mechanical transmission 60 directly to the gear box 26 for powering the vehicle when the pantograph arm 12 is disconnected from the trolley line 14 or when the primary source of AC power is otherwise unavailable.

EXAMPLE

In the preferred embodiment, the mining vehicle might employ a primary AC motor 24 rated at 560kW or about 800 horsepower. A suitable model is the type HXR355LC4B5E available from Atlas Copco of Sweden. A suitable transfer switch 16 is available as Part No. ATSBM31000-KJ from Westinghouse Electrical Components Division, London, Kentucky.

The motor controller 20 is a custom design adapted for the mining environment having the features previously described. A suitable electrical equivalent should be rated for 1400 amperes, such as Part No. 1352-BMC from Allen Bradley/Stromberg of Brown Deer, Wisconsin. A suitable programmable logic controller 18 is also available from Allen Bradley as PLC 5/25, with multiple discrete and analogue inputs and outputs. A suitable auxiliary diesel engine 54 is the F12L413F Deutz engine with the associated generator 56 being a Lima generator Part No. 431RSS2557.

OPERATION

While all mining operations vary, the following is a representative duty cycle for the vehicle of the preferred embodiment.

When not in use, the vehicle is parked in a maintenance area or underground shop. The vehicle is brought into service on auxiliary power to creep over to an overhead trolley line, typically a two-minute run. The pantograph arm is hooked up to the trolley line and the vehicle is run on external power down to a loading zone several hundred to several thousand meters away, a run of about 20 to 30 minutes. The loading zone is typically removed from the main power line to prevent damage to the line during loading, and to avoid electrical safety hazards.

The vehicle then creeps on its auxiliary power to the loading zone and is loaded. Loading typically takes about two minutes. Once loaded, the vehicle creeps back to the trolley line, hooks up and travels as far as possible toward the unloading area, typically a 30-minute run. The vehicle then unhooks from the trolley line and creeps to the unloading area on auxiliary power. Unloading takes about five minutes, after which the vehicle creeps back to the trolley line, hooks up and repeats the cycle.

At the end of a shift, the vehicle returns to the point on the trolley line nearest the maintenance area, unhooks and creeps to a parking space in the maintenance area.

Having illustrated and described the principles of my invention by what is presently a preferred embodiment and several suggested alternatives, it should be apparent to those skilled in the art that the illustrated embodiment may be modified without departing from such principles.

I claim as my invention not only the illustrated embodiments, but all such modifications, variations and equivalents thereof as come within the true spirit and scope of the following claims I claim:

1. A self-propelled vehicle comprising:
    a driven ground-engaging means for forcibly acting on the ground to propel the vehicle;
    a variable speed AC drive motor on the vehicle drivingly connected to the ground engaging means;
    a motor controller having a variable frequency AC output connected to the drive motor;
    a switch on the vehicle having first and second inputs, and a switch output connected to the motor controller, the switch having a first position in which the first input is connected to the switch output while the second input is disconnected from the switch output, the switch having a second position in which the second input is connected to the switch output while the first input is disconnected from the switch output;
    an electrical conductor for engaging an external power source and for transmitting AC power from the external source to the first input;
    an on-board source of AC power mounted on the vehicle and connected to the second input on the switch to provide power to the switch; and
    a switch controller operably connected to the switch and the on-board source, the switch controller being operable in response to a control signal to activate the on-board source, and thereafter to shift the switch from the first position to the second position.

2. The vehicle of claim 1 wherein the on-board source includes an internal combustion engine.

3. The vehicle of claim 1 wherein the switch controller includes a sensor for detecting the AC electric output from the on-board source whereby the switch controller may synchronize the on-board power output with the external power.

4. The vehicle of claim 1 including an on-board AC accessory motor connected to the switch output.

5. The vehicle of claim 4 including a hydraulic pump connected to the accessory motor.

6. The vehicle of claim 1 wherein the switch controller includes means for shifting the switch to its second position in response to disengagement of the conductor from the external power source.

7. The vehicle of claim 1 wherein the switch controller includes means for shifting the switch in response to availability of power from the on-board source.

8. The vehicle of claim 1 wherein the electrical conductor includes means for connecting to a trolley line.

9. A self-propelled vehicle having a traction device contacting the ground to propel the vehicle, the vehicle comprising;
    an AC drive motor on the vehicle;
    a power transmission operably connected to the motor and to the traction device for transmitting power to the traction device;
    an electrical conductor mounted on the vehicle and connectable to an external power source;
    an on-board source of power mounted on the vehicle;
    a switch on the vehicle having a first position in which the conductor is electrically connected to the motor and the on-board source is disconnected from the motor, the switch having a second position in which the on-board source is connected to the motor and the conductor is disconnected from the motor;
    a switch controller operably connected to the switch and to the on-board source, the switch controller being operable in response to a control signal to activate the on-board source, and thereafter to shift the switch from the first position to the second position; and
    a motor controller connected between the switch and the motor and having a variable frequency AC output.

10. The vehicle of claim 9 wherein the on-board source includes an internal combustion engine.

11. The vehicle of claim 9 wherein the on-board source includes means for generating an AC electric output.

12. The vehicle of claim 11 wherein the switch controller includes a sensor for detecting the AC electric output from the on-board source.

13. The vehicle of claim 11 wherein the switch controller includes means for adjusting the AC electric output on the on-board source.

14. The vehicle of claim 11 wherein the switch controller includes means for adjusting the frequency of the AC electric output of the on-board source.

15. The vehicle of claim 9 including an on-board second motor connected to the switch output.

16. The vehicle of claim 15 including a hydraulic pump connected to the second motor.

17. The vehicle of claim 9 wherein the switch controller includes means for shifting the switch in response to disengagement of the connector from the external power source.

18. The vehicle of claim 9 wherein the controller includes means for shifting the switch in response to availability of power from the on-board source.

19. The vehicle of claim 9 wherein the electrical conductor includes means for connecting to a trolley line.

20. A method of operating an electric vehicle having a variable speed AC drive motor, an on-board source of AC power, and a conductor attachable to an external AC power source, the method comprising the steps:
operating the vehicle with power drawn from the external source through the conductor;
sensing a transfer signal;
in response to the signal, activating the on-board source of power;
sensing the external AC power and the on-board AC power;
adjusting the on-board source to synchronize the on-board source with the external source; and
after synchronizing, switching to operation of the vehicle with power from the on-board source.

21. The method of claim 20 including the step of disconnecting the conductor from the external source.

22. The method of claim 20 wherein the step of synchronizing includes adjusting the AC frequency of the on-board source.

23. The method of claim 20 wherein the step of synchronizing includes adjusting the AC phase of the on-board source.

24. The vehicle of claim 9 including a manually operated control signal generator for generating said control signal.

25. A self-propelled vehicle having a traction device contacting the ground to propel the vehicle, the vehicle comprising:
an AC drive motor on the vehicle;
a power transmission operably connected to the motor and to the traction device for transmitting power to the traction device;
an electrical conductor mounted on the vehicle and connectable to an external power source;
a switch on the vehicle having a first position in which the conductor is electrically connected to the motor and the on-board source is disconnected from the motor, the switch having a second position in which the on-board source is connected to the motor and the conductor is disconnected from the motor;
a switch controller operably connected to the switch and to the on-board source, the switch controller being operable in response to a control signal to activate the on-board source, and thereafter to shift the switch from the first position to the second position; and
a motor speed controller connected between the switch and the motor and having a variable frequency AC output, the motor speed controller being operably connected to the switch controller such that the switch controller controls said AC output from the motor controller to the motor.

26. The vehicle of claim 25 wherein the on-board source includes an internal combustion engine.

27. The vehicle of claim 25 wherein the on-board source includes means for generating an AC electric output.

28. The vehicle of claim 27 wherein the controller includes a sensor for detecting the AC electric output from the on-board source.

29. The vehicle of claim 27 wherein the controller includes means for adjusting the AC electric output of the on-board source.

30. The vehicle of claim 27 wherein the controller includes means for adjusting the frequency of the AC electric output of the on-board source.

31. The vehicle of claim 25 including an on-board second motor connected to the switch output.

32. The vehicle of claim 31 including a hydraulic pump connected to the second motor.

33. The vehicle of claim 25 wherein the controller includes means for shifting the switch in response to disengagement of the conductor from the external power source.

34. The vehicle of claim 25 wherein the controller includes means for shifting the switch in response to availability of power from the on-board source.

35. The vehicle of claim 25 wherein the electrical conductor includes means for connecting to a trolley line.

36. The vehicle of claim 25 including a manually operated control signal generator for generating said control signal.

37. A self-propelled vehicle having a traction device contracting the ground to propel the vehicle, the vehicle comprising:
an AC drive motor on the vehicle;
a power transmission operably connected to the motor and to the traction device for transmitting power to the traction device;
an electrical conductor mounted on the vehicle and connectable to an external power source;
an on-board source of power mounted on the vehicle;
a switch on the vehicle having a first position in which the conductor is electrically connected to the motor and the on-board source is disconnected from the motor, the switch having a second position in which the on-board source is connected to the motor and the conductor is disconnected from the motor;
first control means for providing variable frequency AC power to the motor; and
second control means for automatically, in response to a control signal, activating the on-board source, thereafter shifting the switch from the first position to the second position, and for providing a control signal to the first control means.

38. The vehicle of claim 35 wherein the first control means includes only a single controller operably connected to the switch and to the motor.

* * * * *

UNITED STATES PATENT AND TRADEMARK OFFICE
CERTIFICATE OF CORRECTION

PATENT NO. : 5,293,947
DATED : March 15, 1994
INVENTOR(S) : Robert D. Stratton

It is certified that error appears in the above-indentified patent and that said Letters Patent is hereby corrected as shown below:

Column 5, line 52, "claims I claim:" should be --claims. I claim:--
Column 6, line 36, third line of claim 38, ";" should be --:--
Column 7, line 13, third line of claim 46, "connector" should be --conductor
Column 7, line 57, before the subparagraph beginning "s switch on the vehicle, tenth line of claim 54, insert a subparagraph reading --an on-board source of power mounted on the vehicle;--
Column 8, line 41, second line of claim 66, "contracting" should be --contacting--.

Signed and Sealed this

First Day of November, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,293,947
DATED : March 15, 1994
INVENTOR(S) : Robert D. Stratton

It is certified that error appears in the above-indentified patent and that said Letters Patent is hereby corrected as shown below:

Column 5, line 52, "claim I claim:" should be --claims. I claim: --.

Column 6, line 36, ";" should be --:--.

Column 7, line 13, "connector" should be --conductor --.

Column 7, lien 57, before the subparagraph beginning "a switch on the vehicle... insert a subparagraph reading --an on-board source of power mounted on the vehicle; --.

Column 8, line 41 "contracting" should be --contacting --.

This certificate supersedes Certificate of Correction issued November 1, 1994.

Signed and Sealed this

Fourteenth Day of March, 1995

Attest:

BRUCE LEHMAN

Attesting Officer

Commissioner of Patents and Trademarks